US008627764B1

(12) United States Patent
Cloutier et al.

(10) Patent No.: US 8,627,764 B1
(45) Date of Patent: Jan. 14, 2014

(54) COOKING RACK WITH PIVOTING SUPPORTS

(75) Inventors: Andre Dean Cloutier, Blaine, WA (US); Adriana Collins, Beilingham, WA (US); Debra Lynne Sasken-Duff, Blaine, WA (US)

(73) Assignee: Magellan Group, Ltd., Blaine, WA (US)

( * ) Notice: Subject to any disclaimer, the term of this patent is extended or adjusted under 35 U.S.C. 154(b) by 60 days.

(21) Appl. No.: 13/325,697

(22) Filed: Dec. 14, 2011

(51) Int. Cl.
*A47J 43/00* (2006.01)

(52) U.S. Cl.
USPC .................................. 99/450; 99/448; 99/449

(58) Field of Classification Search
USPC .......... 99/450, 448, 449, 426, 421 V; 211/40, 211/41.1, 41.4, 41.5, 41.6, 41.12, 43, 44, 211/45, 50, 184
See application file for complete search history.

(56) References Cited

U.S. PATENT DOCUMENTS

| | | | | |
|---|---|---|---|---|
| D124,197 S | | 12/1940 | Lynch | |
| D131,059 S | | 1/1942 | Lynch | |
| 2,360,026 A | | 10/1944 | Wall | |
| 3,084,617 A | * | 4/1963 | Jamentz | 99/426 |
| D341,523 S | | 11/1993 | Tiemann | |
| 6,116,153 A | * | 9/2000 | Burrows | 99/426 |
| 6,823,773 B2 | * | 11/2004 | Swinford et al. | 99/426 |
| 6,952,991 B2 | * | 10/2005 | Siegel et al. | 99/426 |
| 7,086,538 B2 | * | 8/2006 | Stravitz | 211/11 |
| D538,106 S | | 3/2007 | Julian | |
| D542,092 S | | 5/2007 | Raichlen et al. | |
| 7,669,523 B1 | * | 3/2010 | Zemel et al. | 99/426 |
| D629,251 S | | 12/2010 | Tiemann | |
| 2009/0065452 A1 | * | 3/2009 | Smith | 211/11 |

* cited by examiner

*Primary Examiner* — Tu B Hoang
*Assistant Examiner* — John J Norton
(74) *Attorney, Agent, or Firm* — Dwayne E. Rogge; Schacht Law Office, Inc.

(57) ABSTRACT

The embodiments disclosed herein is having designed specifically for the use in cooking of ribs such as beef ribs, pork ribs etc. although it has been found that the apparatus disclosed herein can also be utilized for other meats such as steaks as well as larger plainer vegetables such as large onions slices sliced eggplant etc. In general, the apparatus will be defined and described in its use relative to cooking of ribs or even understanding. If the disclosure relates to the device which improves upon known prior art cooking racks in that the rack members are not stationary but rather had it about a transverse horizontal axis which allows the need to be pasted on both longitudinal sides for even basting as well as allowing the ribs to be pivoted substantially half way through the cooking process such that the ribs are more evenly cooked on both sides.

6 Claims, 15 Drawing Sheets

COOKING RACK WITH PIVOTING SUPPORTS

BACKGROUND OF THE DISCLOSURE

Field of the Disclosure

This disclosure relates to the field of cooking devices for barbeques, or kitchen ovens. The device disclosed is used for the cooking of substantially planar foods such as ribs, steaks, large sliced vegetables etc.

SUMMARY OF THE DISCLOSURE

Disclosed herein is a rack for cooking food, the rack in one form comprising several components. One component being a frame. The frame in one embodiment comprises: a plurality of substantially parallel longitudinal support rails; and a plurality of transverse support rails extending between ends of adjacent longitudinal support rails. Each of the transverse support rails comprising a lifting handle. Each of the longitudinal support rails in one form comprising a plurality of paired and aligned non-cylindrical surfaces defining non-cylindrical voids. Another component being a plurality of rack members having transverse horizontal cross members configured to vertically and longitudinally support the food to be cooked, the rack members extending vertically above the transverse support rails and pivotably coupled to the non-cylindrical voids. Another component of the apparatus being a grill support extending between the longitudinal support rails and/or the transverse support rails below the cross members of the rack members, the grill support provided to vertically support the food to be cooked.

The rack for cooking food as recited above in one form may be arranged wherein the transverse horizontal cross members of the rack members are substantially cylindrical in cross section.

The rack for cooking food as recited above may be also be arranged wherein the transverse horizontal cross members of the rack members are interconnected by substantially vertical members.

The rack for cooking food as recited above may also be arranged wherein the rack members pivot rotate from a most forward position to a most rearward position without wherein the cross members directly do not directly contact any portion of the rack for cooking food.

The rack for cooking food as recited may also comprise a pivoting stop extension extending in a transverse horizontal direction from a portion of the rack members. In one form a surface of each non-cylindrical voids defines a forward limiting stop and another surface defines rearward limiting stop; wherein the pivoting stop extensions engage the forward limiting stop so as to limit forward rotation of the rack member, and engage the rearward limiting stop so as to limit rearward rotation of the rack member.

The rack for cooking food as recited above may be arranged wherein the rack members extend transversely outward of the frame so as to form engagement surfaces on the transversely outward portions to allow a person to engage these transversely outward portions to pivot the rack members forward and rearward without contacting the food to be cooked.

The rack for cooking food as recited above may also be arranged wherein the rack members extend radially outward of the non-cylindrical voids so as to form engagement surfaces on the radially outward portions to allow a person (cook) to engage these radially outward portions to pivot the rack members forward and rearward without directly contacting the food to be cooked.

DESCRIPTION OF THE PREFERRED EMBODIMENTS

The embodiments disclosed herein are designed specifically for the use in cooking of ribs such as beef ribs, pork ribs etc. although it has been found that the apparatus disclosed herein can also be utilized for other meats such as steaks and larger planar vegetables such as large onion slices, sliced eggplant, pumpkin, etc. In general, the apparatus will be defined and described in its use relative to cooking of ribs for ease of understanding.

The disclosure relates to the device which improves upon known prior art cooking racks in that the rack members are not stationary but rather pivot about a transverse horizontal axis which allows the food to be basted on both longitudinal sides for even basting as well as allowing the ribs to be pivoted substantially halfway through the cooking process such that the ribs are more evenly cooked on both sides.

Figure 1:
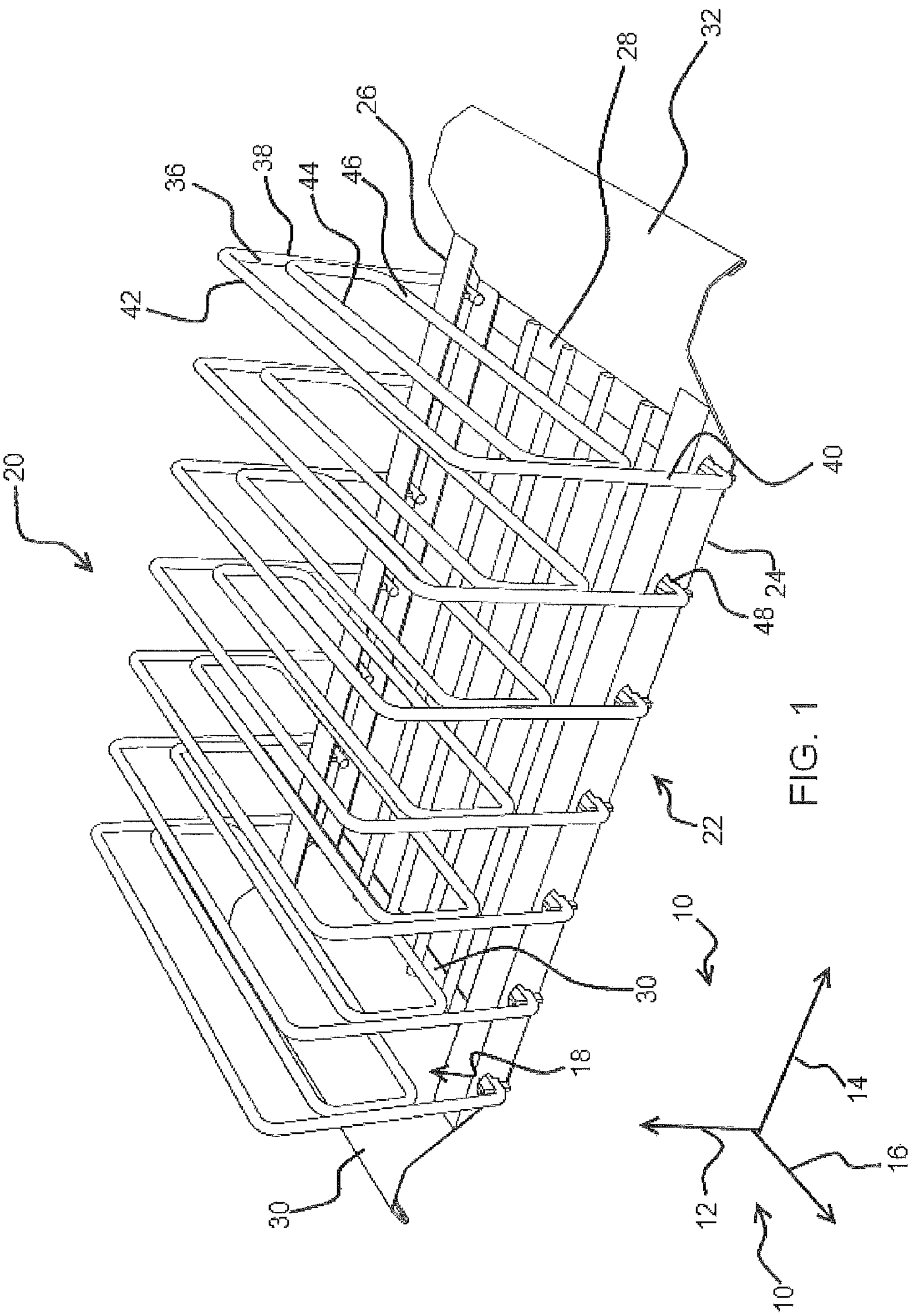
FIG. 1 is a perspective view of one embodiment of the disclosure.
Figure 2:
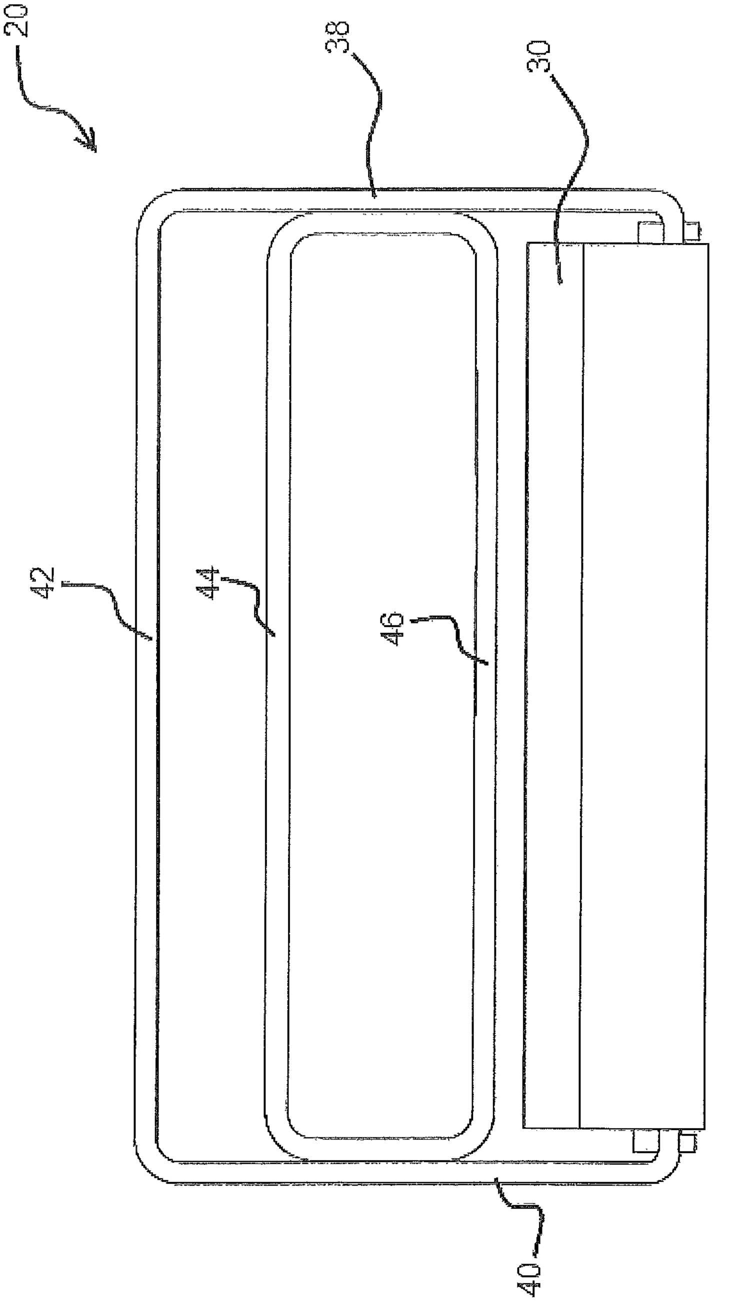
FIG. 2 is a front view of the embodiment of FIG. 1 with the rear view being an identical image thereof.
Figure 3:
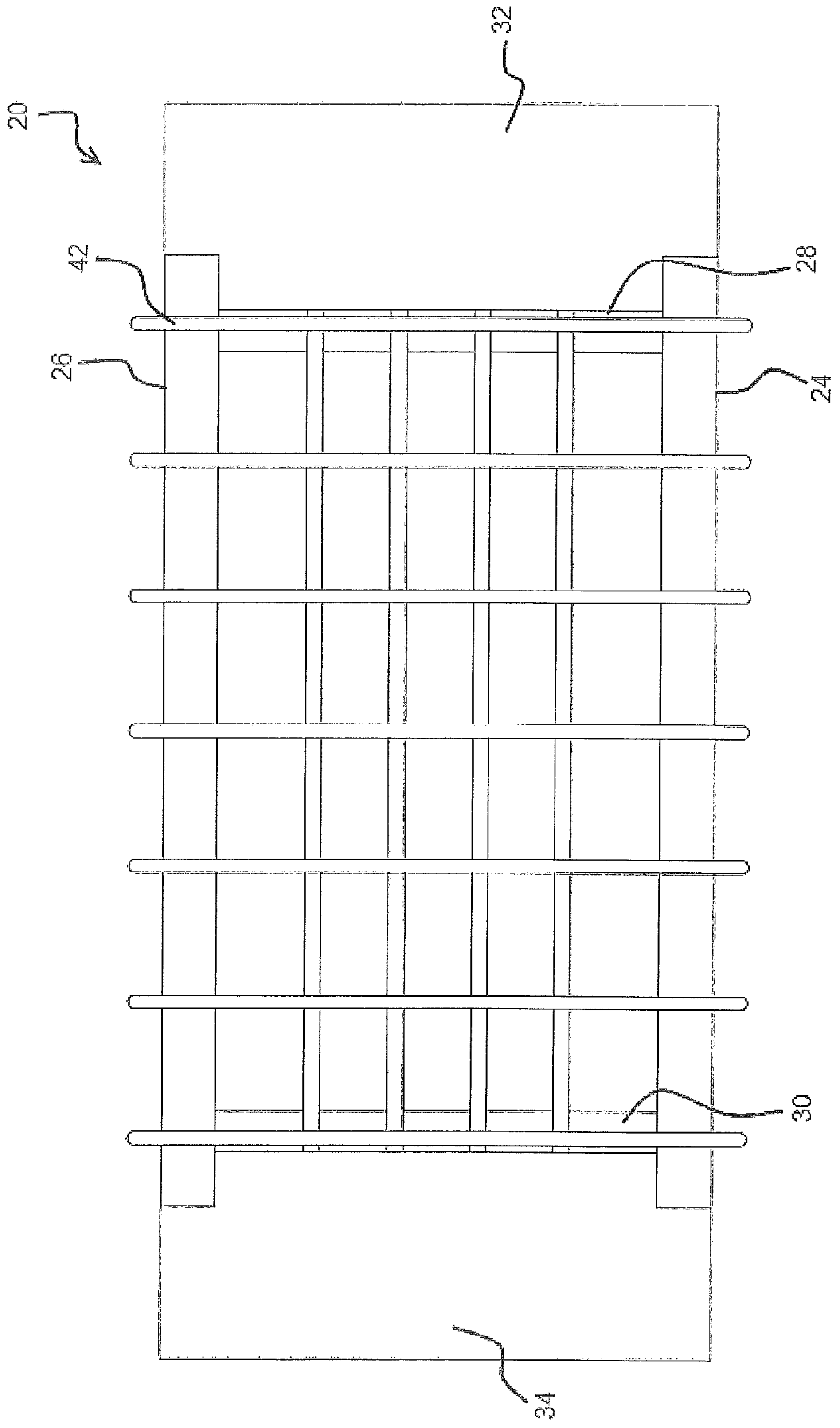
FIG. 3 is a top view of the embodiment of FIG. 1.
Figure 4:
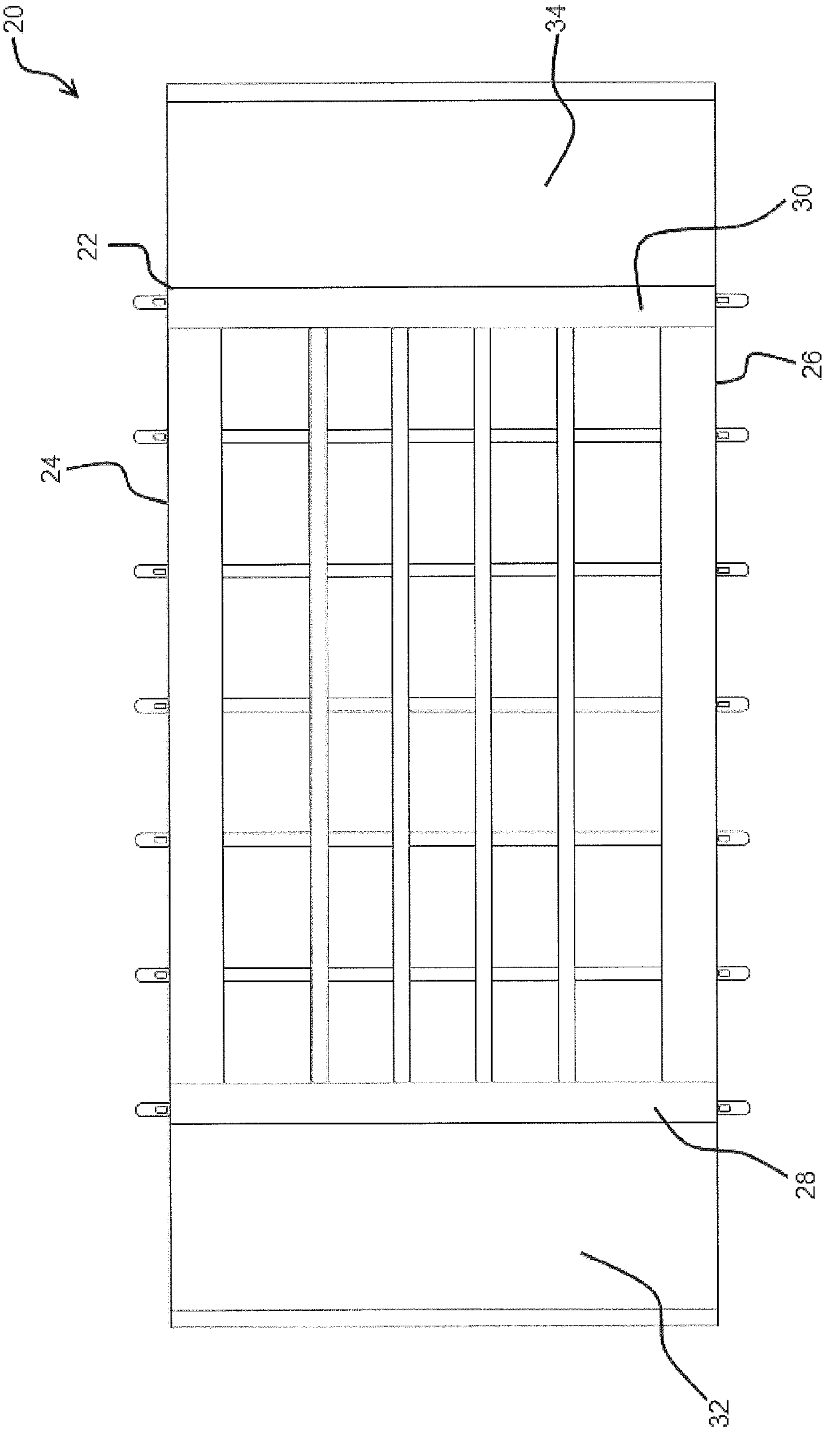
FIG. 4 is a bottom view of the embodiment of FIG. 1.

To aid in understanding of the disclosure, and axes system 10 is utilized such as shown in FIG. 1 comprising a vertical axis 12 pointing in an upward direction, a longitudinal axis 14 pointing in a forward direction, with the opposite direction being defined as rearward, and a transverse axis 16 pointing in a leftward direction with the opposing direction is defined as rightward. Additionally, a radially outward axis 18 is also shown and more easily understood by looking to FIG. 5 where the radially outward axis 18 extends outward from the center of the pivot point of the rack members. These directions and axes are not intended to limit the disclosure but are simply used to aid in understanding.

Looking to FIG. 1, a first embodiment of the cooking rack 20 is shown with one major component being a frame 22 comprising in turn a left longitudinal support rail 24, right longitudinal support rail 26, front transverse support rail 28, and rearward transverse support rail 30. In one form, lifting handles 32 and 34 are provided either extending from the transverse support rails 28 and 30 respectively, or alternatively formed from an extension of the transverse support rails. As shown, the transverse outward portions of the support rails 28 and 30 are attached to the longitudinal ends of the longitudinal support rails 24 and 26.

Additionally, the cooking rack 20 in one form comprises a plurality of rack members 36. Each of the rack members 36 in one form comprises transversely opposing vertical members 38 and 40 having an uppermost cross member 42 therebetween. Additional cross members 44 and 46 may be utilized to separate, support, and reposition the ribs cooked upon the cooking rack 20 as will be described. Each of these substantially vertical numbers 38 engages a noncylindrical void 48 on either transverse side thereof. This engagement will be described in more detail. While the components of only one rack member 36 are described herein, it is understood then that in at least one form, multiple rack members 36 are utilized. For example, the embodiment of FIG. 1 shows seven (7) substantially identical rack members 36.

Figure 5:
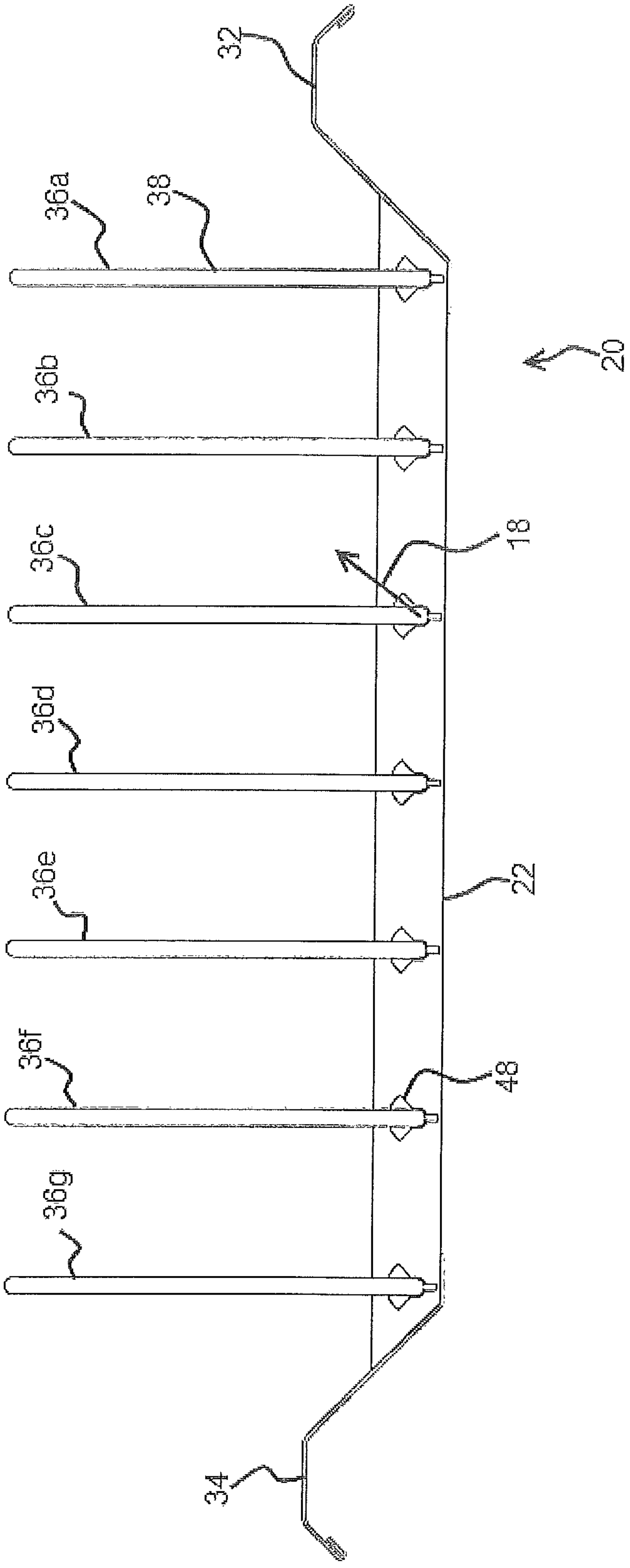
FIG. 5 is a left side view of the embodiment of FIG. 1; with the rack members in a fully vertical position; with the right side view being an identical image thereof.

Looking to the position of the rack members in FIG. 5, it can be seen that the rack members 36 are positioned in a vertically upright position. While the rack members are generally denoted by the numeric identifier 36, the alphabetic suffixes a-g are utilized to identify a particular rack member within the assembly.

Figure 6:
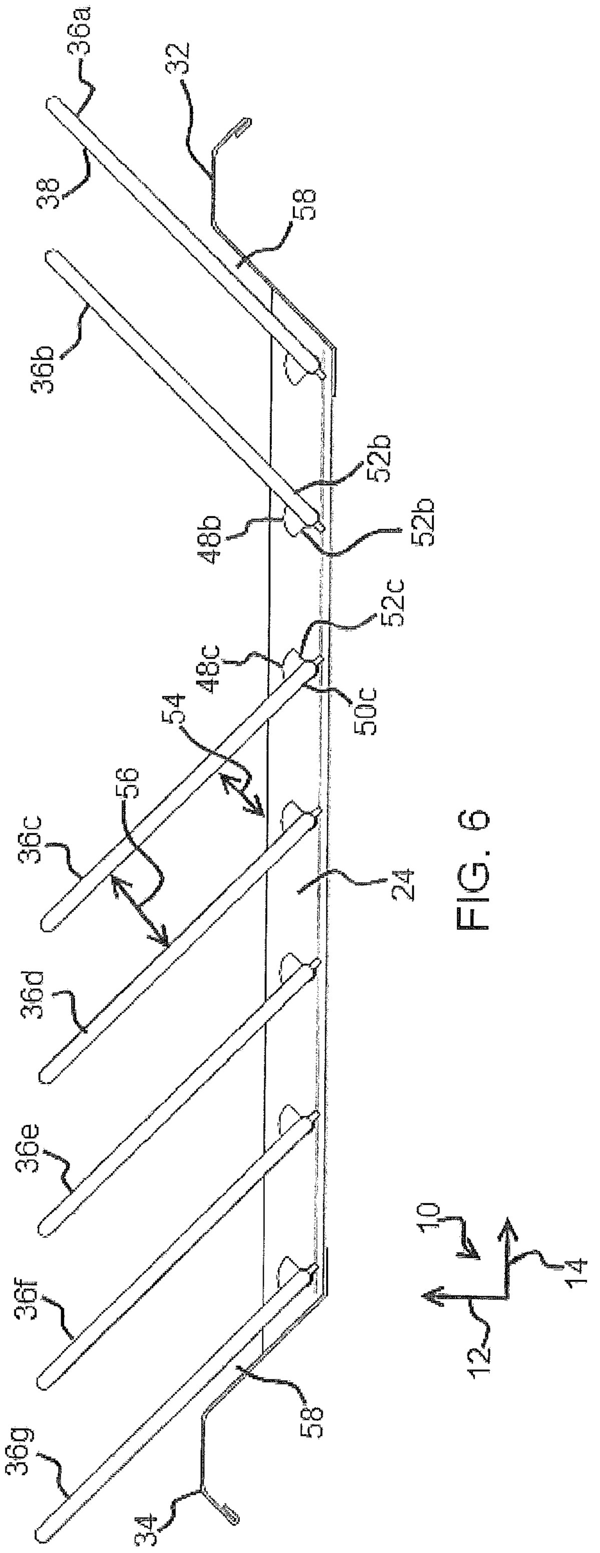
FIG. 6 is a is a left side view of the embodiment of FIG. 1; with the rear (left) five (5) rack members tilted to a rearward position; and the front (right) two (2) rack members tilted to a forward position wherein the right side view being a mirror image thereof.
Figure 7:
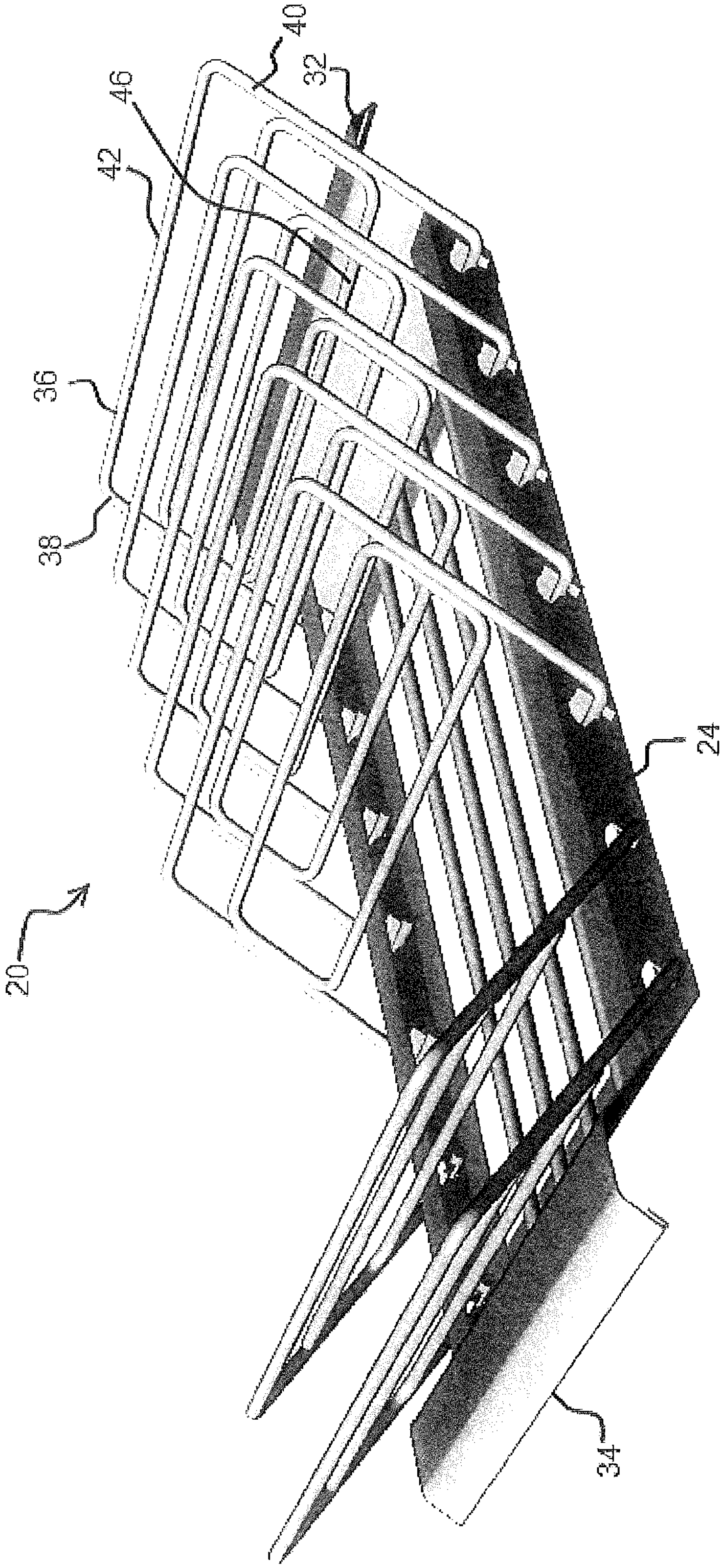
FIG. 7 is a shaded perspective view of the embodiment of FIG. 6.
Figure 8:
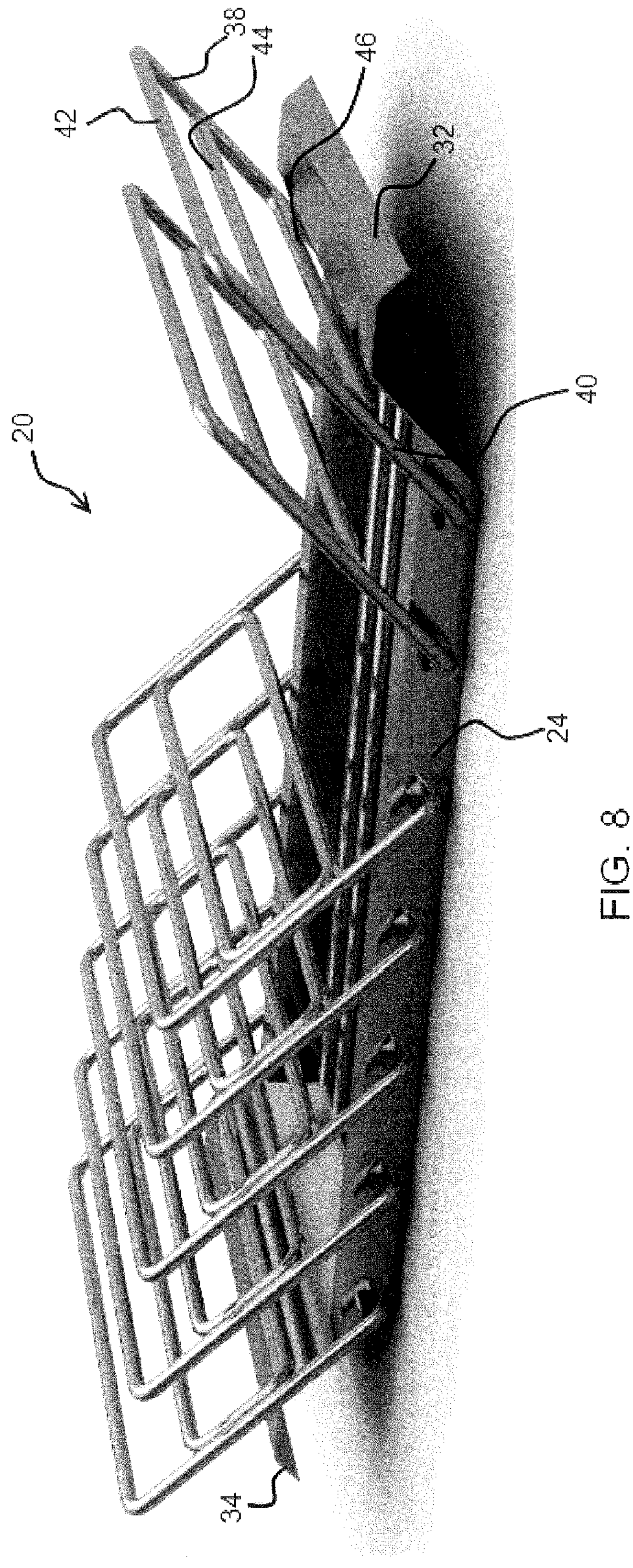
FIG. 8 is a computer rendered view of the embodiment of FIG. 6.
Figure 9:
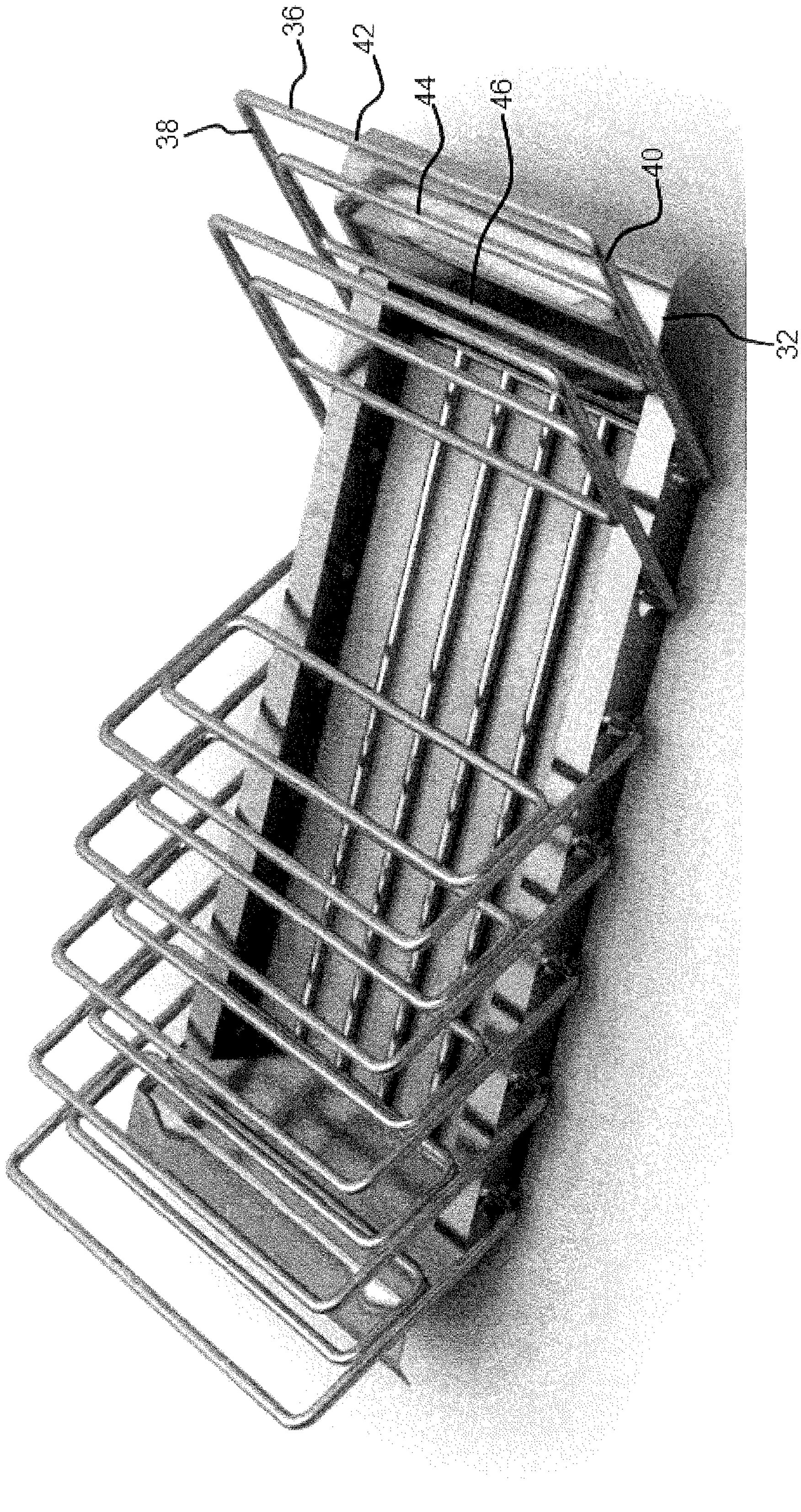
FIG. 9 is a computer rendered top perspective view of the embodiment of FIG. 6.
Figure 10:
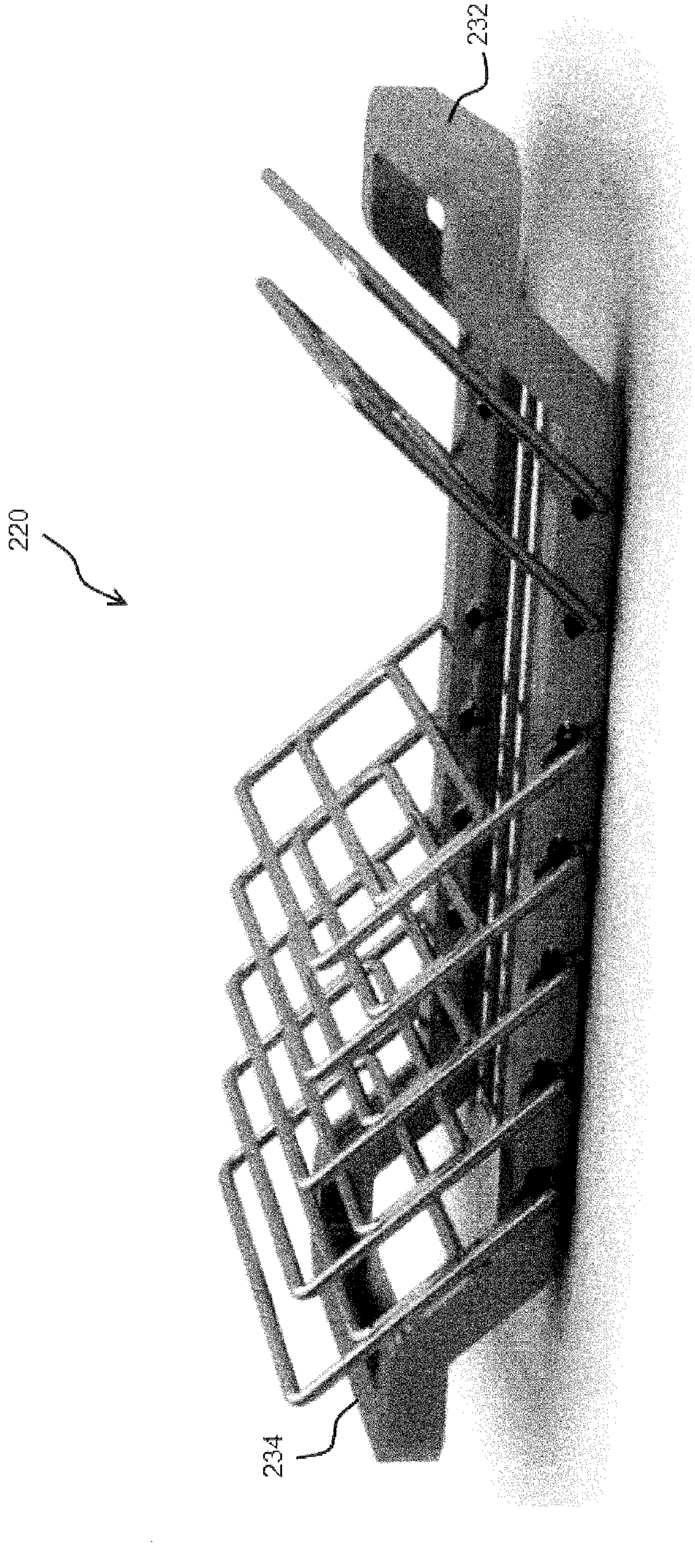
FIG. 10 is a computer rendered side perspective view of another embodiment.
Figure 13:
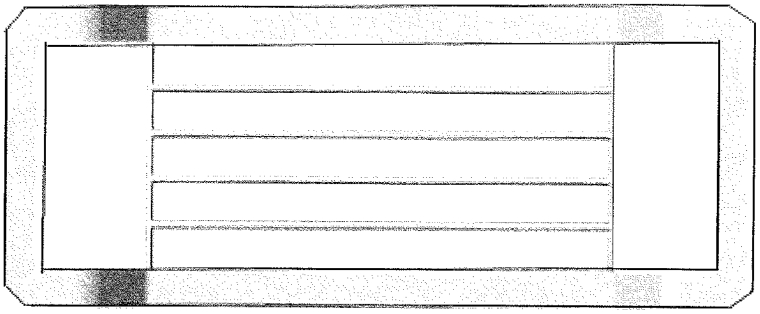
FIG. 13 is a top view of the embodiment of FIG. 10 with the rack members removed to show the underlying components.
Figure 11:
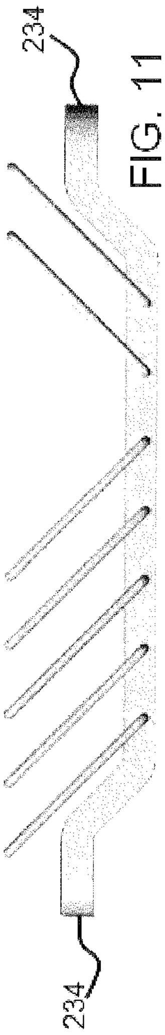
FIG. 11 is a shaded left side view of the embodiment of FIG. 10 with the rear (left) five (5) rack members tilted to a rearward position, and the forward (right) two (2) rack members tilted to a forward position wherein the right side view is a mirror image thereof.
Figure 12:
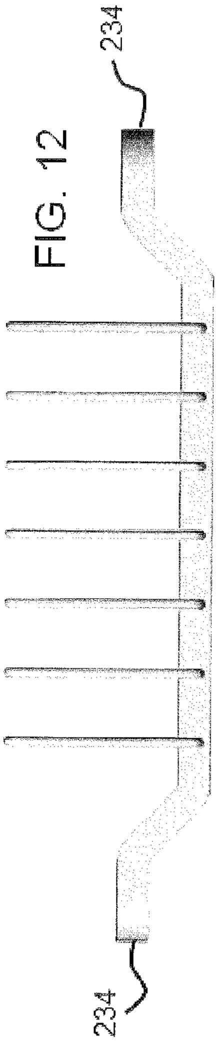
FIG. 12 is a left side view of the embodiment of FIG. 10 with the rack members in a fully vertical position with the right side view being an identical image thereof.
Figure 14:
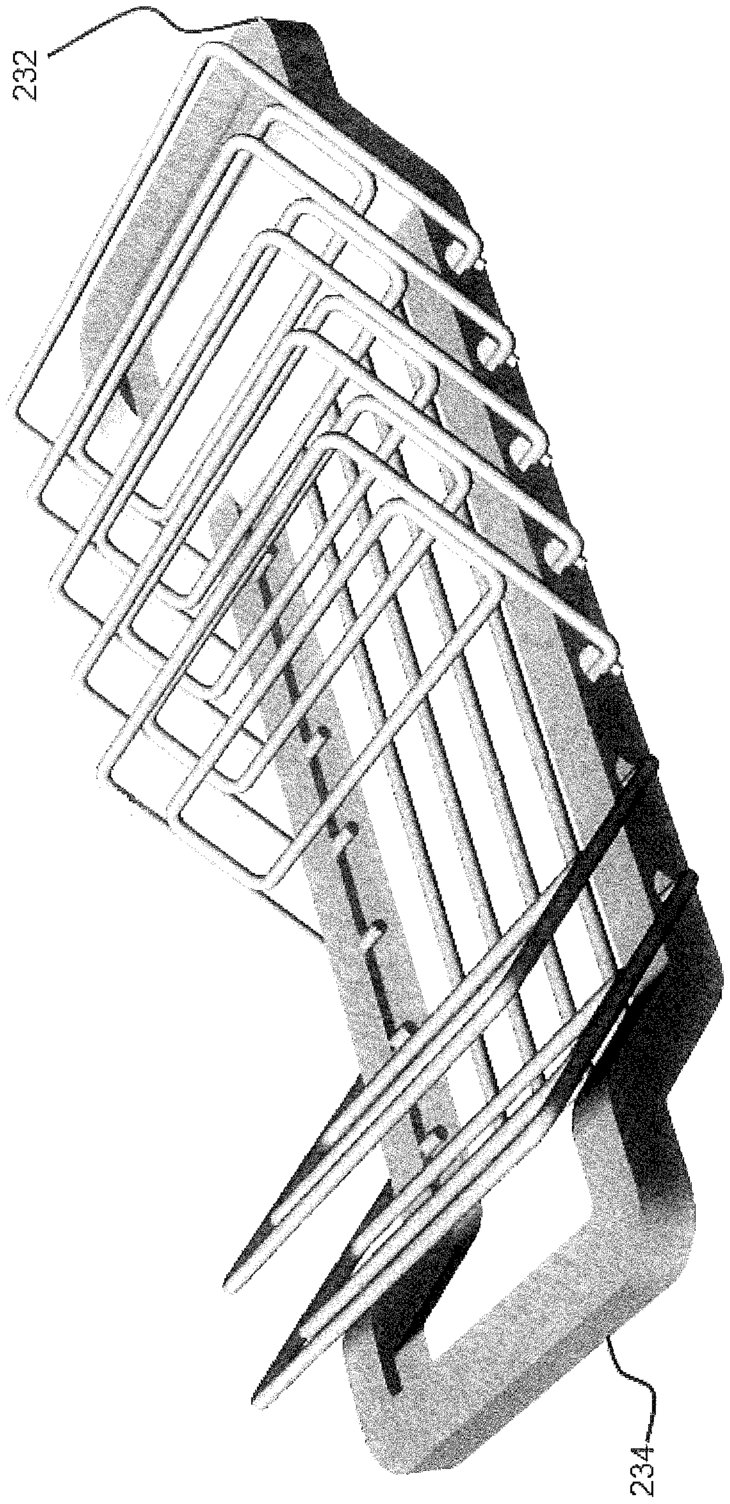
FIG. 14 is a shaded perspective view of the embodiment of FIG. 10 with the right five (5) rack members tilted to a rightward position, and the left two (2) rack members tilted to a leftward position wherein the right side view being an mirror image thereof.
Figure 15:
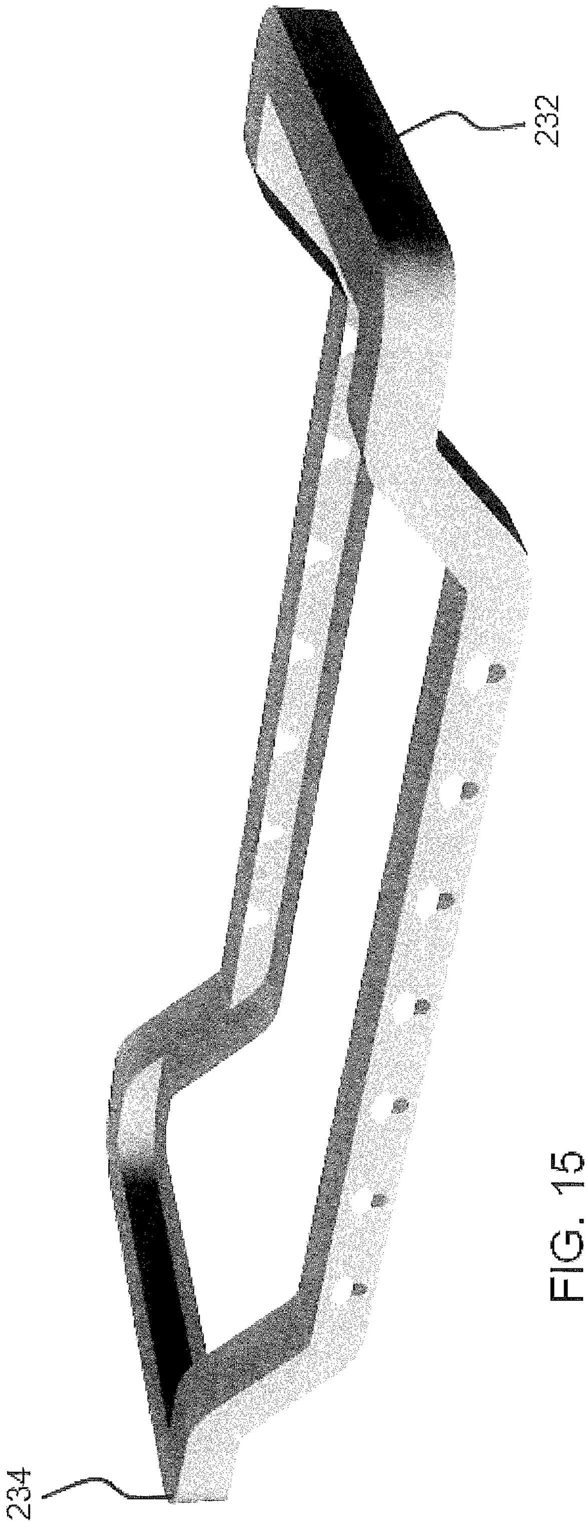
FIG. 15 is a shaded perspective view of the embodiment of FIG. 10 with the pivoting rack members removed to show the underlying components.
Figure 16:
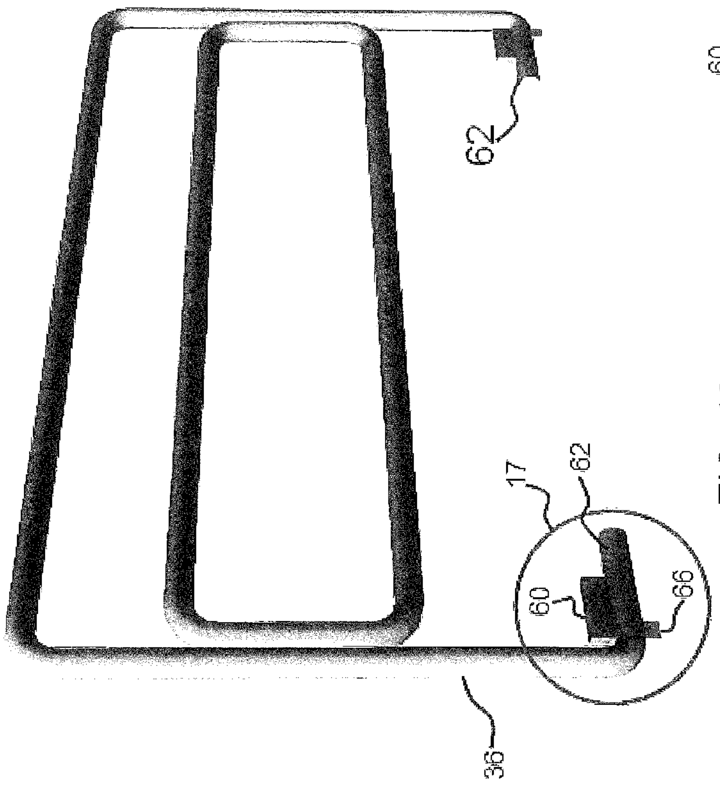
FIG. 16 is a perspective view of one embodiment of the pivoting rack members of the above embodiments.
Figure 17:
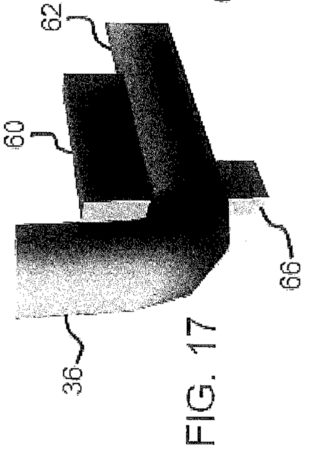
FIG. 17 is a perspective detail view of a portion of the rack member of FIG. 16.
Figure 18:
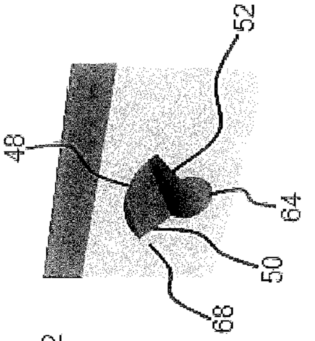
FIG. 18 is a perspective detail view of the embodiment of FIG. 15.
Figure 19:
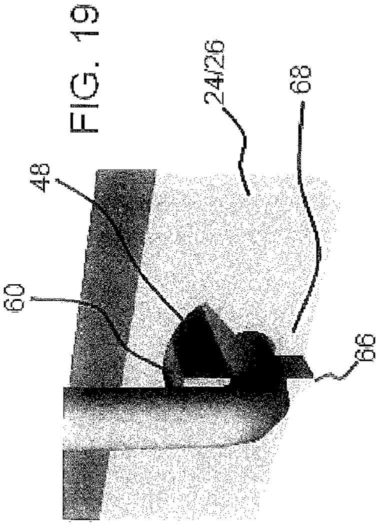
FIG. 19 is a perspective detail view of the embodiments of FIGS. 17 and 18.

As the rack members are not supported from rotational movement in either direction in the position shown in FIG. 5, any bumping or movement of the apparatus would generally cause the rack members 36 to pivot about the openings 48 to a forward or a rearward position. Looking to FIG. 6, it can be seen how the forward two rack members 36A-B have pivoted to a forward facing position, while rear five rack members 36C-G have pivoted to a rearward position. As the voids 48 in one form comprise a rearward stop 50 and a forward stop 52 it can be seen how the rack members 36, as well as any food resting thereon are held apart from adjacent rack members, the frame, food, and the lifting handles by these stops 50, 52. As such, a gap 54 will be provided between the rack member 36 and the longitudinal rails 24 as well as a gap 56 between adjacent rack members 36 and, in one form, a gap 58 between the forward and rearward rack members 36A and 36G and the lifting handles 32 and 34 respectively.

To further explain in one form how rack members 36 pivot, FIGS. 16-19 show how the rack members 36 engage the non-cylindrical voids 48. In particular, the figures show how in one form, a pivoting stop extension 60 extends from a horizontal portion 62 of the rack member 36. The cylindrical portion of the horizontal member 62 will generally engage a pivot portion 64 of the void 48 and as the rack member 36 repositions forward or rearward, the forward and rearward surfaces of the pivoting stop extension 60 engage the forward and rearward limiting stops 50, 52.

In addition to the pivoting stop extension, an insertion stop extension 66 may be utilized which engages the outward surface 68 of the longitudinal support rail 24/26 to maintain the horizontal portion 62 in the proper relative horizontal, transverse position relative to the void 48. In at least one form, the rack member 36 is somewhat deformable in that the rack member may be positioned so as one of the horizontal extension 62 is inserted into a void 48 on one side of the cooking rack 20 and the rack member 36 is deformed outward in a spring-like manner until the opposing horizontal extension 62 can slide past the outer portion 68 of the support rail 24/26 and be positioned into the opposing void 48 in a manner easily understood by one of ordinary skill in the art.

Figure 20:
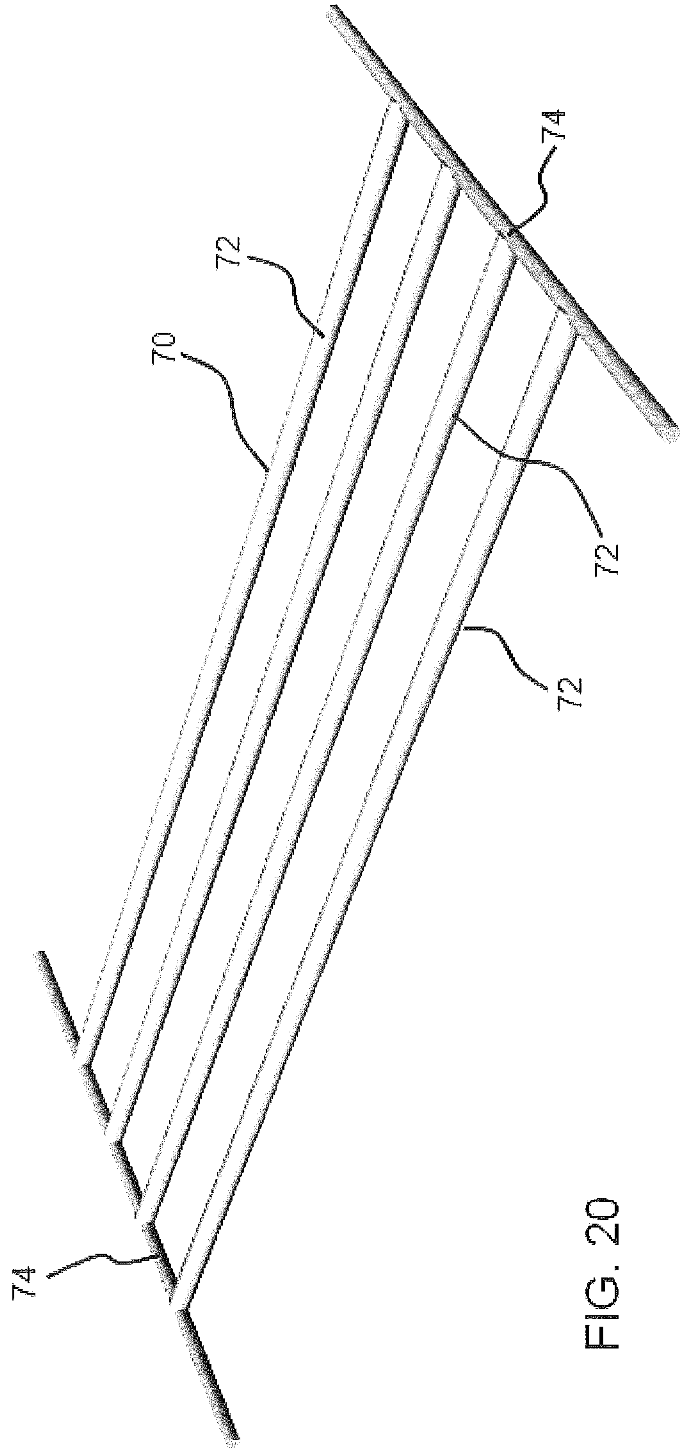
FIG. 20 is a perspective view of one embodiment of a support grill.

Looking to FIG. 20, one embodiment of a grill support 70 is shown comprising a plurality of longitudinal rods 72 fixed to transverse end rods 74. In another form, the longitudinal rods 72 may be directly coupled to the support rails 28/30 or the lifting handles 32/34. The grill support 70 vertically supports the ribs from falling through the cooking rack 20 into the barbecue or oven, which would obviously be detrimental. In one form, the grill support 70 is comprised of cylindrical rods and may or may not be removable for ease in replacement and or cleaning. Similarly, the rack members 36 including the vertical and cross members may be formed of a cylindrical rod. This allows any drippings to pass thorough the rack into a drip pan if the device is used for example in an oven, or the drippings may pass completely through the rack and a supporting structure such as the grate of a barbeque (BBQ) or grill whereupon the drippings may be contained, or ignited to further the taste, smell, and visual appeal of the ribs to be consumed.

In one form, all of the components are formed of a rigid metallic material such as for example stainless steel, which makes the rack 20 easy to clean and relatively impervious to weather and/or contaminants. It is also conceived that at least some of the components may be coated, for ease of cleaning, resistance to corrosion, or visual appeal. The handle portions may also comprise a heat-resistant coating or material to reduce burning or scorching to hands or lifting elements when the rack and ribs are removed from the oven, grill, BBQ, or other heating device.

FIGS. 10-15 show a second embodiment 220 which is functionally identical to the first embodiment but is slightly different in the construction of the lifting handles 232/234.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept.

Therefore we claim:

1. A rack for cooking food, the rack comprising:

a. a frame comprising:

i. a plurality of substantially parallel longitudinal support rails;

ii. a plurality of transverse support rails extending between ends of adjacent longitudinal support rails;

b. each of the longitudinal support rails comprising a vertical upper surface and a transverse surface into which is formed non-cylindrical surfaces defining non-cylindrical voids defining a forward pivot limiting stop and another surface forming a rearward pivot limiting stop;

c. a plurality of rack members each having transverse horizontal cross members configured to vertically and longitudinally support the food to be cooked, the rack members positioned vertically above the transverse support rails and pivotably positioned within the non-cylindrical voids;

d. each rack member comprising a pivoting stop extension protruding in a transverse direction from a portion of the rack member within the non-cylindrical void, the pivoting stop extension configured to contact the forward pivot limiting stop and the rearward pivot limiting stop; and e. a grill support positioned transversely between the longitudinal support rails below the cross members of the rack members; the grill support provided to vertically support the food to be cooked.

2. The rack for cooking food as recited in claim 1 wherein the transverse horizontal cross members of the rack members are substantially cylindrical in cross section.

3. The rack for cooking food as recited in claim 1 wherein the transverse horizontal cross members of the rack members are interconnected by substantially vertical members.

4. The rack for cooking food as recited in claim 1 wherein the rack members rotate from a most forward position to a most rearward position wherein the cross members do not directly contact any portion of the rack for cooking food.

5. The rack for cooking food as recited in claim 1 wherein the rack members extend transversely outward of the frame so as to form engagement surfaces on the transversely outward portions to allow a person to engage these transversely outward portions to pivot the rack members forward and rearward without contacting the food to be cooked.

6. The rack for cooking food as recited in claim 1 wherein the rack members extend radially outward of the non-cylindrical voids so as to form engagement surfaces on the radially outward portions of the rack members to allow a person to engage these radially outward portions to pivot the rack members forward and rearward without contacting the food to be cooked.

* * * * *